United States Patent
Winslow et al.

(10) Patent No.: US 9,951,818 B2
(45) Date of Patent: Apr. 24, 2018

(54) WIND TURBINE YAW BEARING PRE-LOAD

(71) Applicant: Wind Solutions LLC, Sanford, NC (US)

(72) Inventors: Christopher James Winslow, Lemon Springs, NC (US); Matthew Kenneth King, Carthage, NC (US)

(73) Assignee: Wind Solutions, LLC., Sanford, NC (US)

( * ) Notice: Subject to any disclaimer, the term of this patent is extended or adjusted under 35 U.S.C. 154(b) by 384 days.

(21) Appl. No.: 14/710,699

(22) Filed: May 13, 2015

(65) Prior Publication Data

US 2016/0333860 A1  Nov. 17, 2016

(51) Int. Cl.
| | | |
|---|---|---|
| *F16C 39/02* | (2006.01) | |
| *F16B 35/04* | (2006.01) | |
| *F16C 17/08* | (2006.01) | |
| *F03D 7/02* | (2006.01) | |
| *F03D 80/70* | (2016.01) | |

(52) U.S. Cl.
CPC ............ *F16C 39/02* (2013.01); *F03D 7/0212* (2013.01); *F03D 80/70* (2016.05); *F16B 35/04* (2013.01); *F16C 17/08* (2013.01); *F05B 2240/90* (2013.01); *F16C 2360/31* (2013.01); *Y02E 10/721* (2013.01); *Y02E 10/723* (2013.01); *Y02E 10/726* (2013.01)

(58) Field of Classification Search
None
See application file for complete search history.

(56) References Cited

U.S. PATENT DOCUMENTS

| | | | |
|---|---|---|---|
| 2,660,387 A | 12/1951 | Roy | |
| 3,729,292 A | 4/1973 | Heck | |
| 4,487,460 A | 12/1984 | Becker | |
| 6,112,396 A | 9/2000 | Steinbock | |
| 6,199,453 B1 * | 3/2001 | Steinbock | ............ B23P 19/068 29/452 |
| 6,517,060 B1 | 2/2003 | Kemeny | |
| 7,238,009 B2 | 7/2007 | Schellstede | |

(Continued)

FOREIGN PATENT DOCUMENTS

| | | |
|---|---|---|
| CA | 2669006 C | 7/2013 |
| EP | 0945613 B1 | 9/2002 |

OTHER PUBLICATIONS

PCT International Search Report for PCT/US2016/031558, dated Aug. 16, 2016.

(Continued)

*Primary Examiner* — Justin Seabe
*Assistant Examiner* — Juan G Flores
(74) *Attorney, Agent, or Firm* — Leveque IP Law, P.C.

(57) ABSTRACT

A wind turbine yaw assembly has a yaw piston and a yaw bearing pad. A spring resides inside the yaw piston and applies spring pressure to the yaw bearing pad. A threaded yaw piston bushing applies adjustable pressure to the spring. The threaded yaw bushing has a plurality of at least three force adjustment screws distributed symmetrically about the threaded yaw piston bushing. The spring pressure is adjusted by tightening or loosening the plurality of force adjustment screws. This abstract is not to be considered limiting, since other embodiments may deviate from the features described in this abstract.

29 Claims, 12 Drawing Sheets

(56) References Cited

U.S. PATENT DOCUMENTS

| | | | |
|---|---|---|---|
| 7,775,559 B2 * | 8/2010 | Steinbock | E21B 17/085 |
| | | | 285/404 |
| 7,878,432 B2 | 2/2011 | Parham | |
| 8,203,230 B2 | 6/2012 | Hennig | |
| 8,310,080 B2 | 11/2012 | Ramanujam | |
| 8,317,462 B2 | 11/2012 | Daniels et al. | |
| 8,550,769 B2 | 10/2013 | Behnke et al. | |
| 8,601,878 B2 | 12/2013 | Cotrell et al. | |
| 2010/0000375 A1 | 1/2010 | Steinbock et al. | |
| 2010/0176601 A1 | 7/2010 | Pechlivanoglou et al. | |
| 2011/0188988 A1 | 8/2011 | Wadehn | |
| 2011/0254281 A1 | 10/2011 | Noda et al. | |
| 2012/0027585 A1 | 2/2012 | Daniels et al. | |
| 2012/0224799 A1 | 9/2012 | Wagner | |
| 2013/0099494 A1 | 4/2013 | Numajiri et al. | |
| 2013/0272842 A1 | 10/2013 | Juhl | |
| 2014/0245869 A1 | 9/2014 | Rice | |

OTHER PUBLICATIONS

PCT Written Opinion of the International Searching Authority for PCT/US2016/031558, dated Aug. 16, 2016.
Yagi et al., "Technical Trends in Wind Turbine Bearings", NTN Technical Review No. 76, pp. 113-120, 2008.
Dvorak, "No Friction Pads on These Pitch and Yaw Brakes", Force Control Industries, Inc., Fairfield, OH, Mar. 11, 2011.
"Yaw Bearing", Wikipedia entry, updated Apr. 6, 2014.
Mraz, "Yaw Puck—A Small Part With A Big Impact", Availon North America, Press Release, Oct. 9, 2013.
Anon., "Ungraded PEEK Yaw Pad", Wind Warehouse web page, 2015.
Anon., "Wind Turbine Yaw Brake Pucks", VB Seals Inc., Ames, Iowa, Undated, retrieved May 7, 2015.

* cited by examiner

WIND TURBINE YAW BEARING PRE-LOAD

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Many wind turbines utilize a gliding yaw bearing arrangement that allows the nacelle to rotate about the tower in a smooth and controlled manner. The yaw bearings absorb large static and dynamic loads and moments during the wind turbine operation, and provide for smooth rotational characteristics for the orientation of the nacelle under all weather conditions. Such wind turbines include the General Electric 1.x series of wind turbines that have been in use since approximately 2003.

Yaw bearing arrangements often use yaw pads that glide over a surface to provide a controlled degree of resistance to rotation. Yaw pad wear is a significant issue in all such wind turbine systems. When the yaw pads wear, the wind turbine performance suffers and often the wind turbine makes loud noises (sometimes referred to as "fog-horning") which can be disruptive of the lives of people living near a wind turbine or wind farm. This also tends to cause yaw pad vibration which degrades the yaw pads by accelerating pad wear as well as sometimes causing splitting or other damage to the yaw pads.

Lubrication and proper pressure on the yaw pads can be used to reduce the possibility of fog-horning and extend the life of the yaw pads. Servicing the yaw pads to lubricate and properly torque the yaw piston assembly for correct pad pressure is time consuming and expensive. Each of the example GE wind turbines mentioned above typically includes 12 or 18 yaw pads (more or fewer may be used in any given wind turbine design) that should be periodically serviced. To service these yaw assemblies including yaw pad replacement, lubrication, reassembly and torqueing can be an entire day's work for a crew of two technicians. The work is carried out inside the nacelle of the wind turbine high in the air, and the wind turbine is shut down during such service. This not only results in high cost for the technician's time and equipment but also shuts down production of electricity which is a minimum of about 1.5 megawatts. Thus a ten hour maintenance shutdown can cost the operator the service labor costs plus parts cost plus opportunity costs equaling the value of up to 15 megawatt-hours or more of electricity production.

In addition, the work required to service the yaw assemblies can be quite challenging. The work is carried out high in the air inside a nacelle using tools and parts that have to be brought up with the technicians. Also, in many cases the yaw assemblies may be resting in tight spaces that may be difficult to access with the large tools currently required.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings.

GLOSSARY

Figure 1:
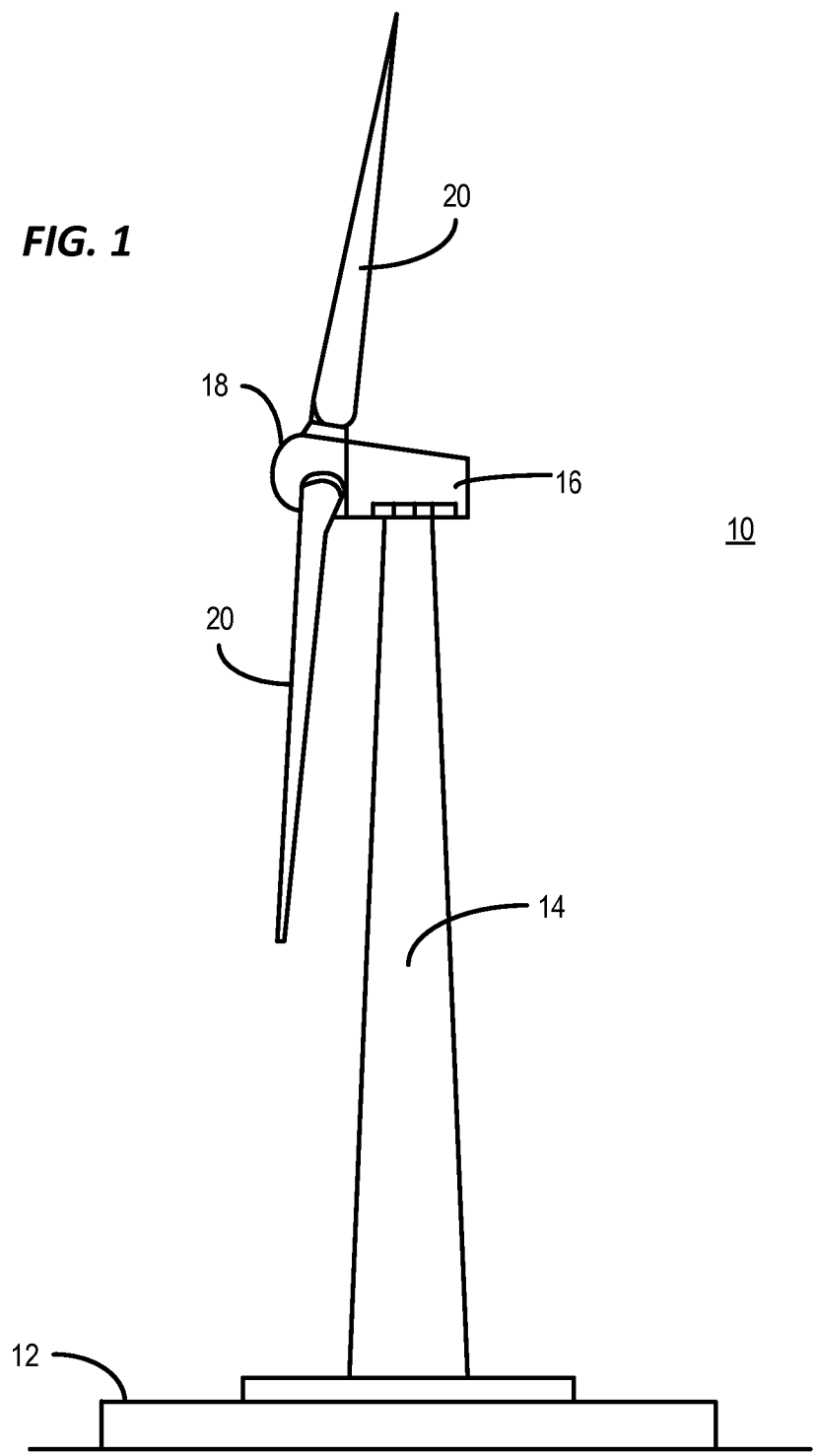
FIG. 1 is an illustration of a wind turbine power generator consistent with certain example embodiments of the present invention.

Reference throughout this document to "one embodiment", "certain example embodiments", "examples", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "a" or "an" or "the", as used herein, are defined as one or more than one.

The term "plurality" and "multiple", as used herein, is defined as two or more than two.

The terms "including" and/or "having" and/or "has", as used herein, are defined as comprising (i.e., open language).

The verb "is" should be considered open ended language that refers to an example, such that the term "A is a B" means that A is an example of something that can be used as B.

The term "coupled", as used herein, is defined as connected, although not necessarily directly, and not necessarily mechanically.

The term "program" or "computer program" or similar terms, as used herein, is defined as a sequence of instructions designed for execution on a computer system. A "program", or "computer program", may include a subroutine, a function, a procedure, an object method, an object implementation, in an executable application, an app, a widget, an applet, a servlet, a source code, an object code, a sketch, a shared library/dynamic load library and/or other sequence of instructions designed for execution on a computer system.

The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "non-transitory" as used in connection with a computer readable storage medium is intended to exclude propagating signals, but not volatile or non-volatile memory/storage devices.

Terms indicative of direction such as up, down, upward, downward, top, bottom, etc. are used herein for convenience and refer to the specific implementations described for reference. However, these terms should not be considered absolute in that the principles discussed herein are applicable to yaw assemblies that may be oriented in a direction different from the directions referenced for ease of understanding of the particular embodiments discussed in detail herein. (e.g., An "upper surface" may be oriented vertically in operation without change in principle provided that any direction associated with other relevant elements are rotated similarly.)

The word "about" or "approximately" or "around" when accompanying a numerical value is to be construed as indicating a deviation of up to and inclusive of minor deviations from the stated numerical value, for example, in many instances within up to about 3% unless indicated otherwise.

A "nacelle" is a cover housing that houses all or most of the generating components in a wind turbine, including the generator, gearbox, drive train, yaw bearing assembly, and brake assembly.

A yaw system of a wind turbine is the set of components responsible for the orientation of the wind turbine rotor towards the wind.

A "yaw pad" (or yaw bearing, gliding yaw pad or gliding yaw bearing or yaw bearing pad or yaw brake pad, yaw puck, etc.) is a dry or lubricated pad, often made of bronze or a composite material, that bears against a bearing surface, usually a large diameter steel disk having a gear at the rim. This yaw pad is used to stabilize rotation a of wind turbine's nacelle and provide smooth rotation of the nacelle into the wind under a wide range of weather conditions.

"Yaw bearing pad material" as used herein means the material used to make a yaw bearing pad. Such material includes, but is not limited to, brass, bronze and polymers, composites, sintered bronze, sintered metal, polyether ether ketone (PEEK), oil impregnated bronze, and layered synthetic fiber reinforced formulations (e.g., having a wear layer of polyester resin and fabric with polytetrafluoroethylene (PTFE) fibers).

An "anti-rotation collar" as used herein is a structure that may reside at the interface of a thrust stem and a yaw piston that stabilizes the thrust stem by inhibiting rotation of the thrust stem and/or limiting the degree of rocking motion of the thrust stem so as to reduce or eliminate contact with the yaw piston and/or wear to the yaw piston caused by such motions piston.

DETAILED DESCRIPTION

While this invention is susceptible of embodiment in many different forms, there is shown in the drawings and will be herein described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Turning now to FIG. 1, an external view of a wind turbine generator 10 consistent with certain embodiments is depicted. The wind turbine 10 includes a tower or pillar 14 erected on a foundation 12, a nacelle 16 mounted at the top end of the tower 14, and a rotor head 18 provided on the nacelle 16 in a manner allowing rotation about a substantially horizontal axis. A plurality (three, in this embodiment for example) of turbine blades 20 are attached to the rotor head 18 in a radiating pattern about its rotation axis. Wind striking the turbine blades 20 causes the rotor head 18 to rotate about the rotation axis, and a generator converts this rotational force to electricity. The turbine blades 20 are connected to the rotor head 18 in a manner allowing movement with respect to the wind direction, thus making it possible to change pitch angles of the turbine blades 20.

In certain embodiments, a wind vane (not shown) detects wind direction and provides wind direction information to a controller such as a programmable logic controller (PLC) to trigger the yaw mechanism in order to adjust the yaw of the nacelle 16.

Figure 2:
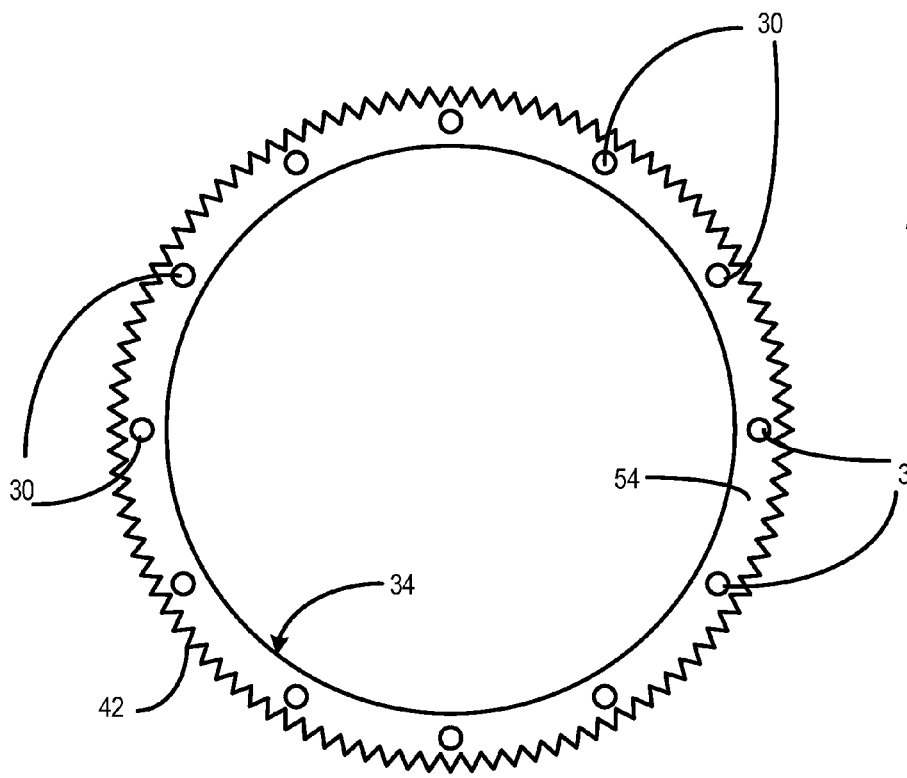
FIG. 2 is an example arrangement of yaw breaks arranged about a nacelle gear in a wind turbine consistent with certain example embodiments of the present invention.

When the wind turbine nacelle is positioned on the tower and the yaw bearing assembly is completed the pressure on each of the individual yaw gliding pads of each yaw bearing assembly is adjusted in order to avoid un-even wear of the gliding pads and excessive loading on some sectors of the yaw bearing. In order to achieve that, an adjustment mechanism is provided, which enables technicians to adjust the contact pressure of each individual gliding element in a controllable and secure way. In an example as depicted in FIG. 2, a wind turbine may include twelve to eighteen (twelve shown) yaw bearing assemblies 30 that are arranged around a large gear 34 residing at the junction of the bottom of the nacelle 16 and the top of the tower 14 as shown. These yaw bearing assemblies 30 may be equally spaced (common for systems with 18 yaw bearing assemblies) or unequally spaced (common with 12 yaw bearing assemblies). The yaw bearing assemblies 30 are situated in a circular arrangement. In other examples, eighteen or more or less such yaw bearing assemblies 30 may be provided. These yaw assemblies 30 use yaw pads 50 (shown later) that serve as gliding pads that are in sliding contact with a steel slew ring 54 which often forms a part of a gear 34 and provides a surface upon which the yaw pad glides. Gear 34 generally has teeth 42 at the outer periphery to form a gliding-disk/gear-rim. The teeth may be located at the inner or the outer cylindrical face of the disk, while the arrangement of the gliding pads yaw bearing assemblies 30 and their exact number and location can vary.

Figure 6:
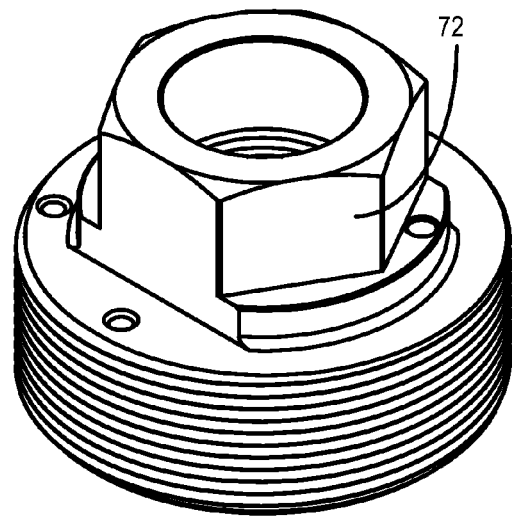
FIG. 6 is a perspective view of yaw piston bushing 64 of FIGS. 3-5.
Figure 3:
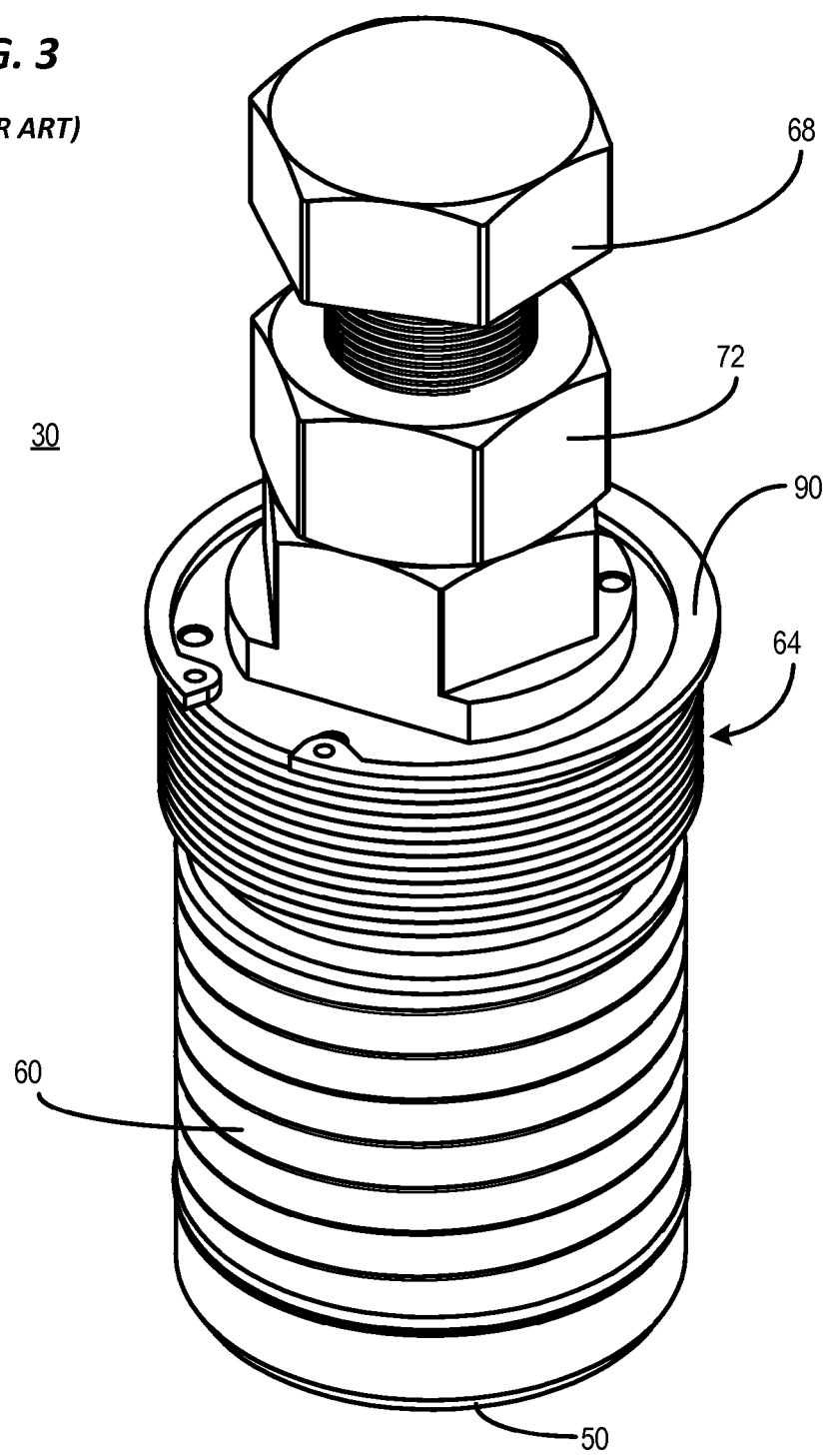
FIG. 3 is a perspective view of a portion of a conventional yaw bearing assembly.
Figures 4, 5:
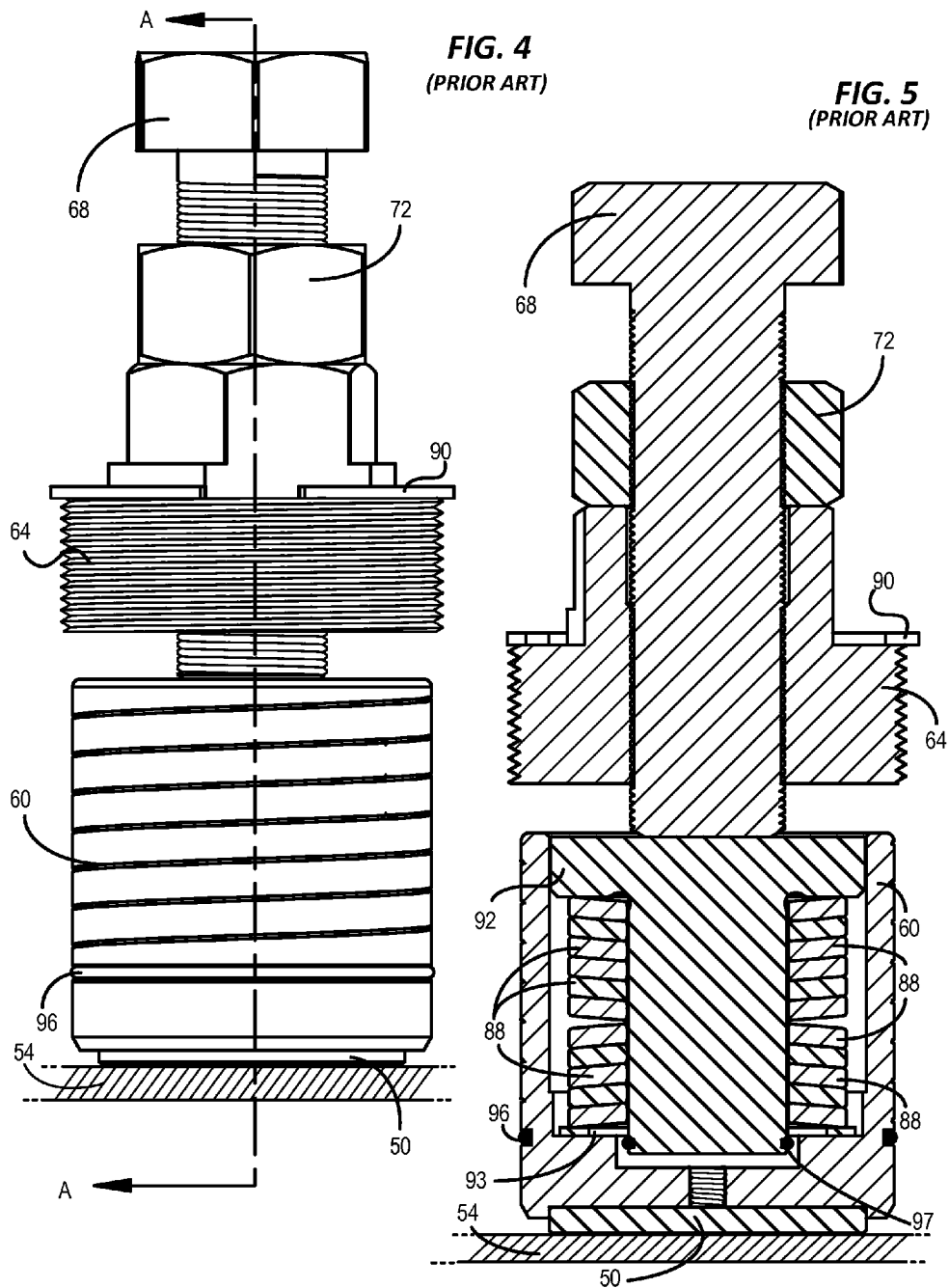
FIG. 4 is a side view of a portion of the conventional yaw bearing assembly.
FIG. 5 is a cutaway section view of a portion of the conventional yaw bearing assembly along line A-A of FIG. 4.
Figure 7:
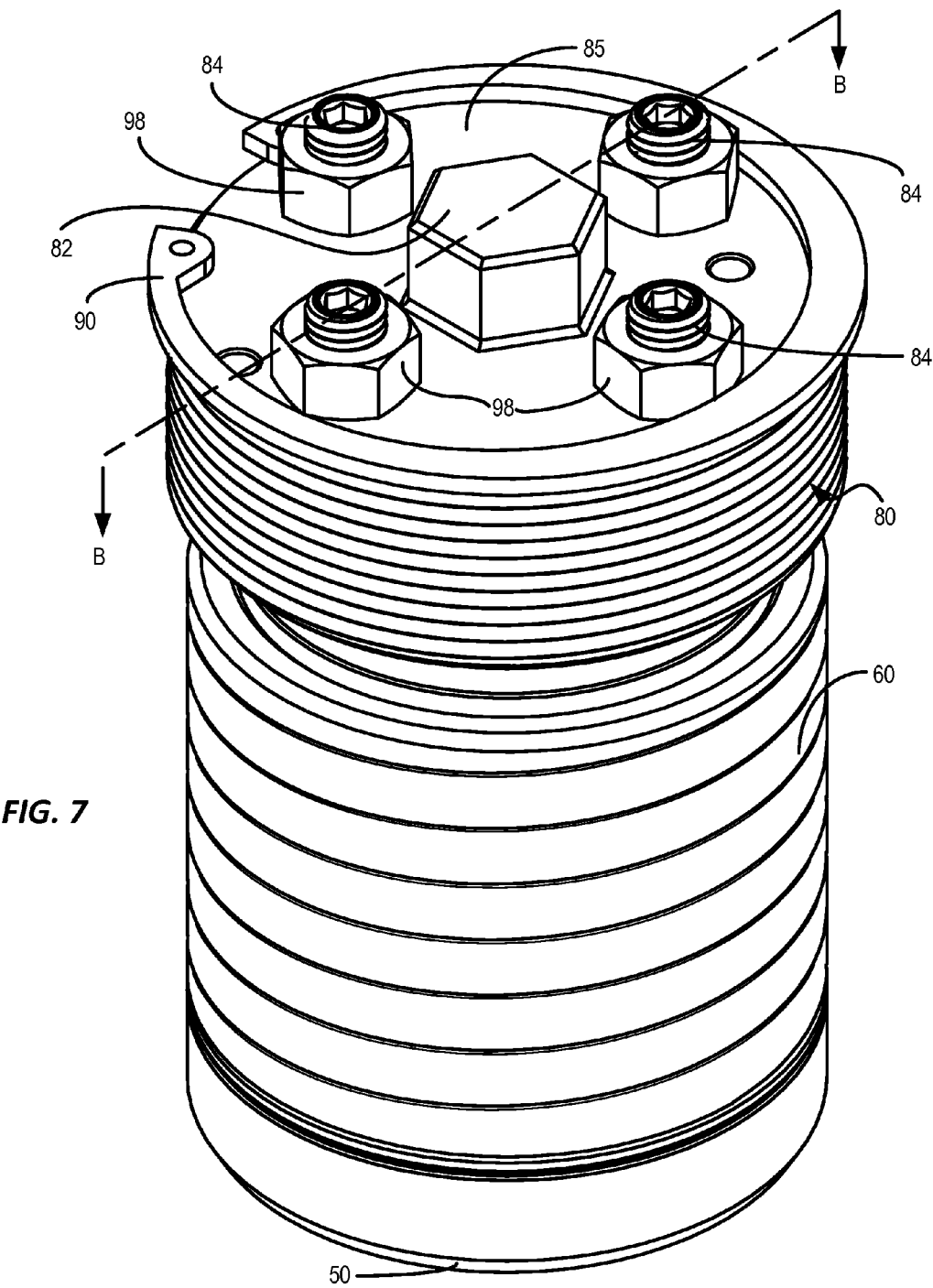
FIG. 7 is a perspective view of a yaw bearing assembly using four pressure adjustment bolts consistent with certain example embodiments of the present invention.

FIGS. 3-5 depict a portion of a conventional bearing assembly 30 as used in certain General Electric brand wind turbines. The gliding yaw bearing 30 uses pads 50 (often made of bronze, brass, mild metal alloys or polymers) distributed in a circular arrangement as a part of each yaw bearing assembly 30 depicted in FIG. 2. These bearings are pre-tensioned so that the gliding bearings help to eliminate play or uneven wear in the bearings 50. The gliding yaw pads 50 are pressed via pressure elements such as springs 88 against the slew ring 54 to stabilize the nacelle 16 against undesirable movement. In certain embodiments, the pressure elements can be a stack of simple steel washer springs 88 residing inside a yaw piston 60. The yaw piston 60, under spring pressure, presses against the yaw pad 50 to engage the yaw pad 50 firmly against the slew ring 54. The piston 60 is held into place by a threaded yaw piston bushing 64 that is threaded into a housing assembly of the yaw bearing assembly. Yaw piston bushing 64 is shown in FIG. 6. The springs are preloaded by tightening a large central bolt 68. In one example, the manufacturer specifies that this bolt should be torqued to a torque of 165 Newton-Meters plus ⅚ of a turn. Once torqued to this specification, the bolt 68 is locked into place with a lock nut 72 until further service is needed.

In order for these bolts to be torqued or re-torqued, a technician (or team of technicians) climbs or is lifted to the nacelle 16 of the wind turbine 10, enters the nacelle 16 and utilizes a torque wrench to torque the bolt to the specified torque. For this high level of torque to be manageable by one or two technicians, the wrench is generally quite large and bulky. It is burdensome for the technician to carry a large wrench up to the nacelle along with any other equipment and parts needed, and such wrench has to be used in a difficult environment and sometimes in a rather tight space. This can lead to technician fatigue. In tight spaces it may be difficult for the technician to access the bolt and/or read the torque wrench. As a result, maintenance of such turbines is difficult and quite expensive and can lead to technician fatigue or injury.

This arrangement has also been found to suffer from rocking and other motion that causes wear to the yaw piston 60 caused by the single point of contact of the bolt 68 contacting thrust stem 92 and the lack of support at the bottom of the thrust stem 92. As shown in FIG. 5, there is no support for the thrust stem 92 at or near the bottom. The springs 88 rest on hardened washer 93 but is free to rotate and move side to side in a rocking motion as a result of being forced downward from a single point of contact from bolt 68. This introduces wear on the yaw cylinder surface from contact with the upper portion of the thrust stem 92.

Referring now to FIGS. 7-12, an improved arrangement is provided for simplifying the servicing of the yaw assembly and providing improved workspace and extended life. In this embodiment, the threaded yaw piston bushing 64 is replaced with an improved threaded yaw piston bushing 80, which is also shown assembled in FIG. 7, in top views for two example implementations in FIGS. 9 and 10, in a cutaway view in FIG. 8, in an isolated perspective view in FIG. 11 and in an exploded perspective view in FIG. 12.

The improved threaded yaw piston bushing 80 has a central hex nut shaped member 82 in one example implementation that facilitates threading the threaded yaw piston bushing 80 into the top of the yaw cylinder 78. A plurality of steel force adjustment screws 84 (i.e., three or more) facilitate the preloading of springs 88 to press the yaw pad 50 into firm contact with the slew ring 54. In this example, three force adjustment screws 84 (e.g., socket head screws in this example) are disposed symmetrically 120 degrees apart for three force adjustment screws or 90 degrees apart for four force adjustment screws about the top 85 of the threaded yaw piston bushing 80 and are screwed through the threaded holes 86 in the threaded yaw bushing 80 passing through the bottom and pressing downward on the thrust stem 92. The thrust stem 92 can be made of, for example, SAE grade 4137 chrome-molybdenum alloy steel, or for example can be made of SAE grade 4140 chrome-molybdenum alloy steel which is heat treated to harden the thrust stem 92 to withstand the force of the force adjustment screws and the force of the spring 88. In other examples, four or more force adjustment screws can be used and are desirably symmetrically disposed about the yaw piston bushing 80. Thrust stem 92 in turn presses downward compressing a spring which in this embodiment is made up of a stack of spring washers 88 (also referred to as "Bellville spring washers" or "Bellville springs").

Instead of using a hardened steel washer as in FIG. 4, the present example embodiment utilizes an anti-rotation collar 99 which is made of hardened steel. Collar 99 is shaped somewhat like an inverted top-hat or flange shape with an opening at the bottom center. Collar 99 serves to prevent the springs 88 from damaging the surface of the yaw piston 60, but also fits within the stepped down opening below the thrust stem 92. This configuration narrows the gap at the bottom of the thrust stem 92 and the interface is buffered by O-ring 97 to minimize the rocking and rotation of the thrust stem. This helps prevent the thrust stem 92 from moving far enough to rub against and wear the inner surface of the yaw piston 60. This stabilizes the structure and reduces vibration, rocking, noise and wear.

The spring washers 88 press downward on the anti-rotation collar 99 which forces the yaw piston 60 and thus the yaw pad 50 downward into engagement with the slew ring 54. Once the proper downward pressure is achieved by torqueing screws 84, the setting can be locked in by tightening down lock nuts 98 thereby preventing movement of screws 84. Other spring devices and assemblies could also be used without limitation.

The yaw pad 50 is commonly made of brass or bronze or a polymer or a composite. It is shaped similar to a hockey puck (and is often referred to as a "yaw puck") in that it is shaped as a cylindrical segment of yaw bearing pad material having a circular perimeter, and having an upper surface and having a lower surface with the lower surface being substantially parallel to the upper surface. The edges of the pad 50 are generally slightly chamfered.

The yaw piston 60 is commonly made of bronze or brass or other mild metal or metal alloy. The hardened steel spring interface washer 93 that is conventionally used prevents the spring washers 88 from digging into the lower surface of the inside of yaw piston 60, but does nothing to inhibit rocking or rotation of the thrust stem 92. Thus, anti-rotation collar 99 is used to prevent wear of the lower inside surface of the yaw piston 60 and to stabilize the thrust stem 92 against rotation and rocking motions. O-Ring 97 forms an interface between the thrust stem 92 and the anti-rotation collar 99 in addition to holding springs 88 in place during assembly. The yaw piston 60 is sealed to its mating cylinder 78 by O-ring 96 and the threaded yaw piston bushing 80 is retained within the yaw cylinder 78, after being threaded into place, by a C-clip (i.e., a snap ring or retaining ring, etc.) 90 that mates to a groove in the inner surface near the top of the yaw cylinder 78. C-clip 90 is used to prevent the threaded yaw piston bushing 80 from backing out of the yaw cylinder 78 after installation and pre-tensioning of springs 88.

Thrust stem 92 uses the O-ring 97 to hold spring washers 88 in place for ease of assembly. A threaded hole 100 is provided at the bottom of the yaw piston 60 so that a threaded rod or bolt can be threaded into the hole 99 during assembly and disassembly for use as a handle to assist in maneuvering the yaw piston 60 into position.

By use of this arrangement, the spring pre-loading force that is achieved by adjustment of force adjustment screws 84 in order to compress springs 88 is distributed among a plurality of force adjustment screws 84 rather than one larger bolt 68. This substantially reduces the amount of torque per screw that is needed to achieve the total force specified for preloading the springs 88 when compared to the large central bolt used in the arrangement of FIG. 3. This in turn means that the technician can carry a much smaller torque wrench to the nacelle 16 and can more easily achieve the specified torque and more easily achieve the specified torque in tight spaces with reduced fatigue. Once this specified torque is achieved on each force adjustment screw 84, lock nuts 98 are tightened down to lock the adjustment in.

Thus, in accord with certain implementations, a wind turbine yaw assembly has a yaw piston 60 and a yaw bearing pad 50. A spring 88 resides inside the yaw piston 60 and applies spring pressure to the yaw bearing pad 50. A threaded yaw piston bushing 80 applies adjustable pressure to the spring via the thrust stem 92. The threaded yaw bushing 80 has a plurality of at least three force adjustment screws 84 distributed symmetrically about the threaded yaw piston bushing 80. The spring pressure is adjusted by tightening or loosening the plurality of force adjustment screws 84. A plurality of lock nuts 98 are threaded to the force adjustment screws 84 to lock the force adjustment screws into place. The thrust stem 80 is disposed within the yaw piston 78 and between the force adjustment screws 84 and the yaw pad 50 and is arranged to apply force through the spring to the yaw pad.

In addition to permitting a lower amount of torque per force adjustment screw to be used, this arrangement is more compact. Comparing FIG. 4 with FIG. 8, it is easy to see that the improved arrangement of FIG. 8 has a height of the assembly is reduced to approximately the height of the yaw cylinder 78 itself in the improved arrangement. The improved arrangement is only about ⅓ as tall as the arrangement shown in FIG. 4, with the improved arrangement being about two inches tall as compared to about 6½ inches tall for the arrangement of FIG. 4.

Referring back to FIG. 4, in this arrangement, the adjustment bolt 68 and lock nut 72 extend well above the top of the yaw cylinder 78 (which ends at about the height of the bushing 64. By reducing this height, not only can the technician access the yaw assembly more easily for service, but additionally, this space can be readily utilized for installation of a retrofit lubrication systems or other devices as will be discussed later.

Hence, this improved arrangement enables the technician to work more easily and efficiently in tight spaces using smaller and more easily manipulated tools at a lower level of fatigue. Also, since there is a plurality of screw adjustments, the centering of the thrust stem 92 can be adjusted to help avoid the thrust stem rubbing against the inside of the yaw piston 60 and introducing wear and generating a portion of the noise associated with the fog-horning effect. Also, rotation of the stem is inhibited and the structure is more stable by having a plurality of N contact points rather than a single central contact point. Moreover, the multiple contact points from force adjustment screws 94 are situated further from the center of the threaded yaw bushing 80 and close to the perimeter of the thrust stem 92 than any potential point of contact between bolt 68 and the top of the thrust stem 92. By virtue of this positioning of multiple force adjustment screws 94 to a position closer to the perimeter of the thrust stem 92, the force adjustment screws 94 provide resistance to rotation at positions that provide greater leverage than the central point of contact used in the system of FIG. 4. Further, since there are N points of contact (with N being greater than or equal to three), the assembly is more stable and less prone to wobbling and contacting the walls of the yaw cylinder than with a single point of contact. Resistance to rotation and rocking is further reduced by use of the anti-rotation collar 99.

Figure 8:
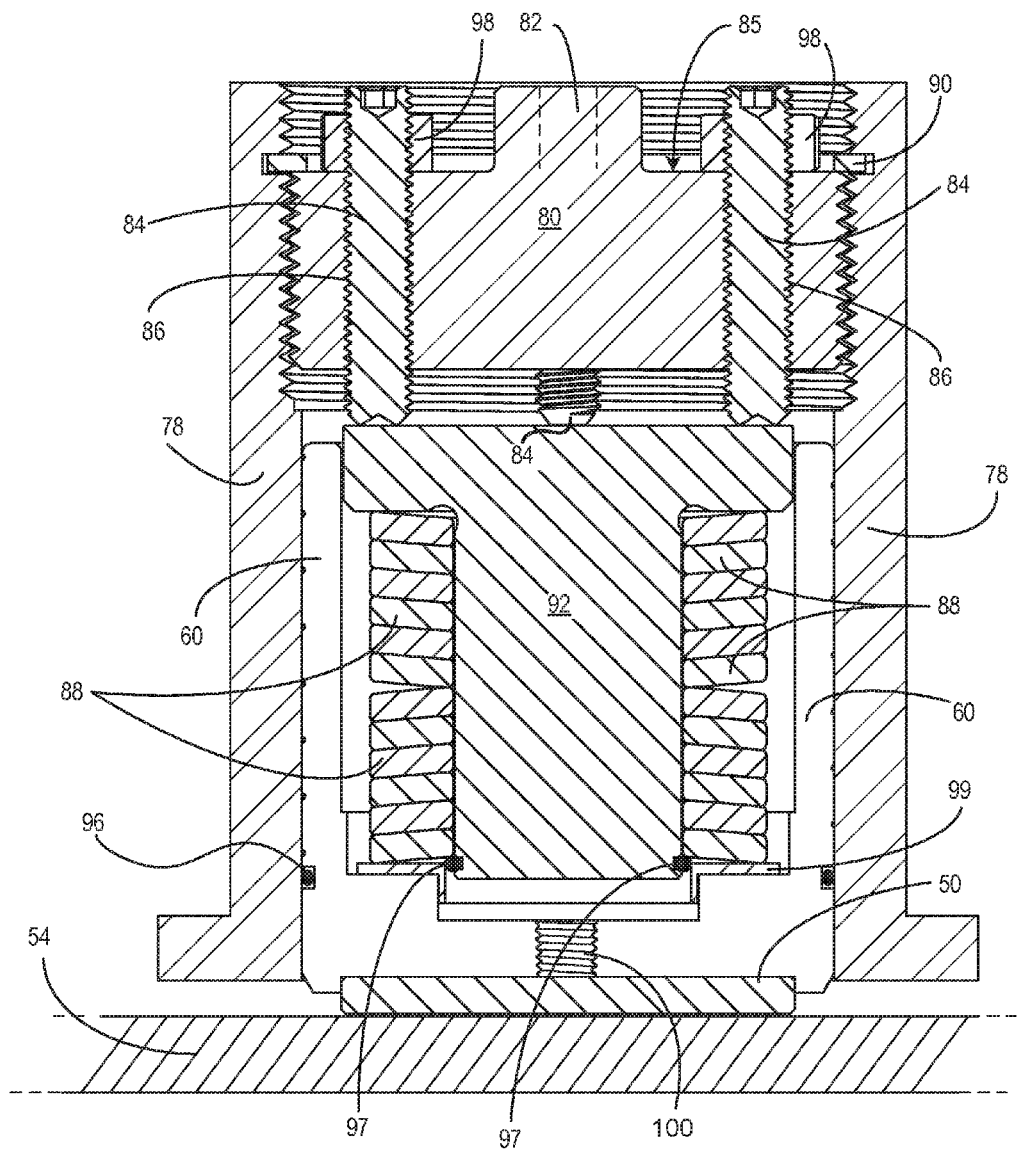
FIG. 8 is a cutaway section view of a yaw bearing assembly along lines B-B of FIG. 7 consistent with certain example embodiments of the present invention.
Figure 9:
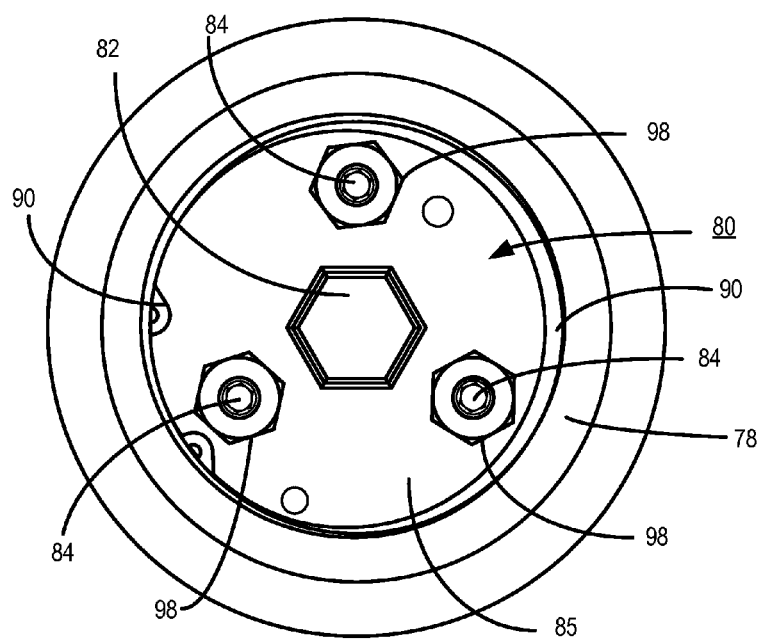
FIG. 9 is a top view of an example yaw bearing assembly using a three pressure adjustment bolt threaded yaw piston bushing consistent with certain example embodiments of the present invention.
Figure 10:
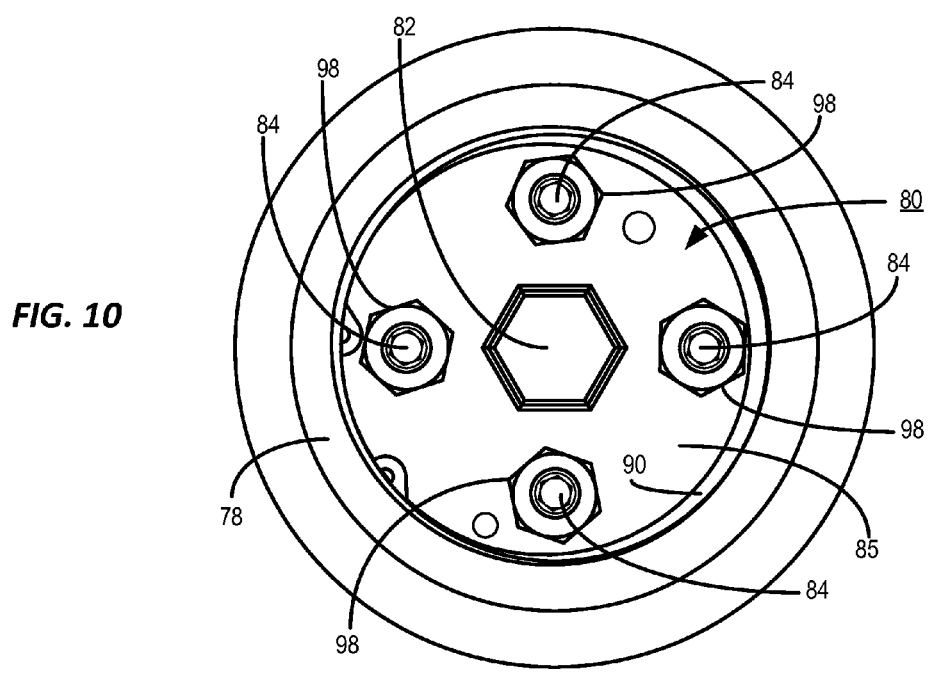
FIG. 10 is a top view of a yaw assembly using an example four pressure adjustment bolt threaded yaw piston bushing used consistent with certain example embodiments of the present invention.
Figure 11:
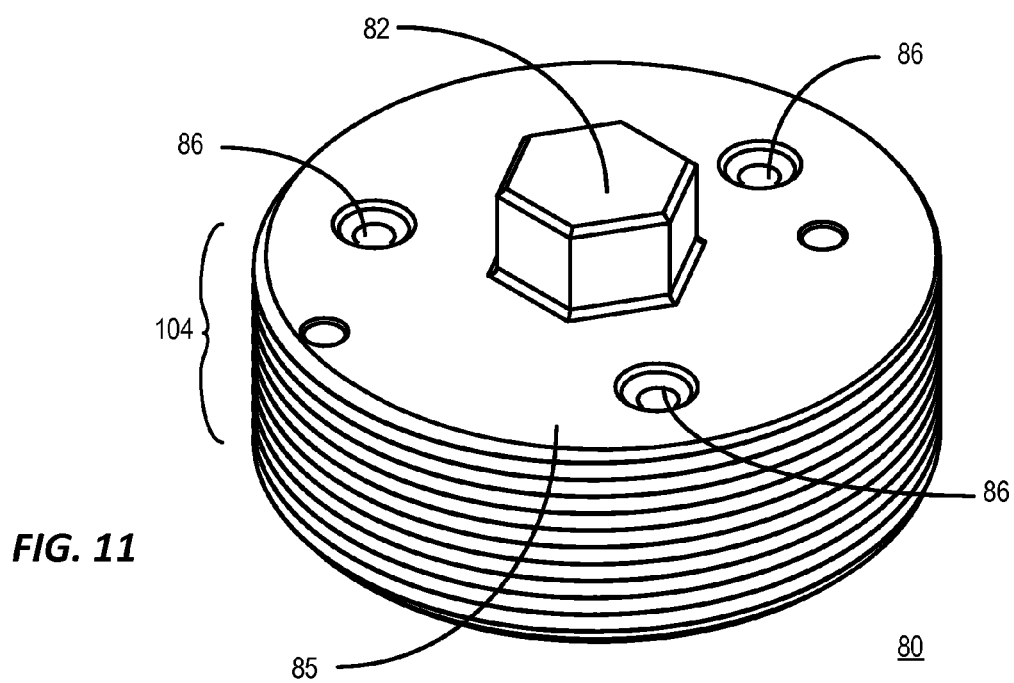
FIG. 11 is a perspective view of an example three pressure adjustment bolt threaded yaw piston bushing consistent with certain embodiments of the present invention.

With particular reference to FIG. 11, the threaded yaw bushing 80 has a cylindrical threaded segment 104 that is threaded on the perimeter with male threads to screw into mating female threads in the wall of the yaw cylinder 78 (See FIG. 8). A plurality of threaded holes 86 extend through the cylindrical threaded segment from top 85 to the bottom of the threaded yaw bushing 80 to accept the force adjustment screws 84. The holes are preferably arranged symmetrically around the center of the cylindrical threaded segment and spaced away from the perimeter far enough to not compromise the strength of the threaded member but near the perimeter so that the force adjustment screws 84 contact the thrust stem near its edge (e.g., for 3 screws, 120 degrees apart, for 4 screws 90 degrees apart, for 5 screws, 72 degrees apart, etc.). Other symmetrical arrangements can also be used. In this example, the center line of the threaded holes 86 can be located at a bolt circle of roughly 67 mm (2.637 inches) from the center and roughly 16.4 mm (0.64 inch) from the outer perimeter of the threaded bushing, but this is not to be limiting. The holes are preferably evenly spaced at intervals of 360/N where N is the integer number of threaded holes (and force adjustment bolts 84 and lock nuts 98) and where N is greater than or equal to 3, but other arrangements will also occur to those skilled in the art upon consideration of the present teachings.

At the top center of the threaded yaw bushing resides a machined hex shaped wrench mating structure 82. In this example, the wrench mating structure is similar to a hex nut that is sized so as to accept a standard sized wrench (e.g., a 26 mm socket wrench). This structure 82 serves as a structure that can be gripped by a wrench so that the wrench can be used to facilitate screwing the male threaded segment of yaw bushing 80 into the mating female threaded portion of the yaw cylinder with a suitable wrench so as to provide leverage. In other embodiments, instead of a hex shaped structure 82, an arrangement that accepts a spanner wrench, a hex socket that accepts an Allan wrench, a structure that accepts a specialized wrench, a central horizontal hole to accept a rod or screwdriver (operating as a wrench), or other convenient structure could alternatively be provided. In certain embodiments, the structure 82 can even be approximately flush or lower than the upper surface 85 of the threaded yaw bushing 80 (e.g., by machining one or more slots, holes, threaded holes, etc. into the upper surface 85 in order to allow the threaded yaw bushing 80 to be gripped for threading into the yaw cylinder 78. Other variations are possible and will occur to those skilled in the art upon consideration of the present teachings.

Thus, in accord with certain embodiments consistent with the present teachings a wind turbine threaded yaw piston bushing 80 consistent with certain example embodiments has a cylindrical segment having a top surface 85 and a bottom surface and having threads at the periphery of the cylindrical segment that are sized to mate with threads in a yaw cylinder 78. N threaded holes 86 pass through the cylindrical segment from top surface to bottom surface that are sized to accept N force adjustment screws 84 to thread into the N threaded holes. The N threaded holes 86 may be distributed symmetrically about the cylindrical segment. A wrench mating structure 82 is situated at or near the top surface 85 of the cylindrical segment. An anti-rotation collar 99 can be disposed between the spring 88 and the yaw piston 60 at a lower end of the thrust stem 92.

Thus, this assembly is incorporated within wind turbine 10, having a nacelle 16 and a tower 14. The slew ring 54 resides between the nacelle 16 and the tower 14, and the yaw pad is pressed downward against the slew ring by the force of the yaw piston.

N lock nuts 98 are sized to screw onto the force adjustment screws 84 can be provided to lock the force adjustment screws into place. The force applied to preload the yaw piston assembly is adjusted by adjustment of the N force adjustment screws 84 and locked into place by use of the N lock nuts 98. Spring 88 and a thrust stem 92 reside within the yaw piston 60. The yaw piston 60 is pressed downward within the yaw cylinder by the plurality of N screws 84 passing through the plurality of N threaded holes 86 to apply downward pressure via the spring 88 to the yaw piston 60. Yaw pad 50 is pressed downward against a slew ring 54 under the force of the yaw piston 60.

In one example embodiment, the cylindrical threaded segment 104 of the threaded yaw bushing 80 is approximately 35 mm from upper surface to lower surface and about 50 mm (about two inches) in total height with M100×3.0 threads on the outer periphery. The outer diameter of the threaded yaw piston bushing 80 is approximately 100 mm (3.94) inches in diameter to the outside of the threads. To account for the mating of the threads, the diameter to the outside threads is slightly under 100 mm (e.g., 99.8 mm). The threaded yaw bushing 80 may be machined from steel or other metal.

The force adjustment screws 84 in this example can be socket head screws that are approximately 50-75 mm (about 2-3 inches) in length (e.g., about 60 mm) and about 12 mm (0.47 inch) in diameter and having M12×1.75 male threads that mate with corresponding female threaded holes 86 in the threaded yaw bushing 80. Commercially available screws such as McMaster-Carr (Atlanta, Ga.) part numbers 92605A338 and 92905A538 extended point alloy steel set screws and similar screws are believed suitable. In other embodiments, other screws such as 10-14 mm screws or similar Imperial or English size screws may be utilized. In this example, the cylindrical segment may have substantially parallel top and bottom surfaces. The cylindrical segment is approximately 35 mm (about 1.38 inches) from top surface to bottom surface and about 50 mm (about 2 inches) in total height in this example.

The cost of machining and raw materials for the improved threaded yaw piston bushing 80 as shown in FIG. 11 has been found to be about 40-50% lower than that of yaw piston bushing 60 due to a reduction in mass of the raw material and reduction in the amount of raw material that is cut away during production. The new assembly should improve damping of the system to reduce fog-horning as well as reduce rocking and rotation of the piston 60 within the cylinder by virtue of multiple points of application of the force and use of collar 99, thereby substantially increasing the life of the various parts and reducing service intervals. Worker fatigue is reduced in making the force adjustments and the adjustments can be carried out in a safer and more precise manner using smaller and more convenient tools.

Figure 14:
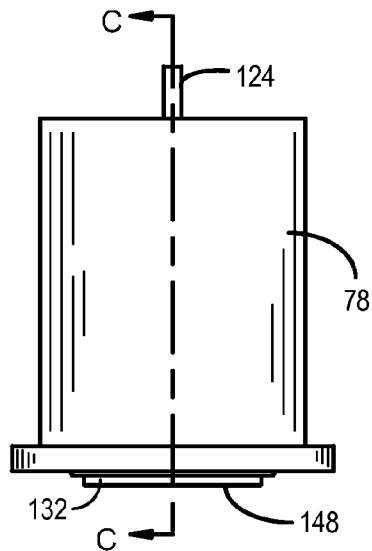
FIG. 14 is a side view of a yaw piston assembly that utilizes a yaw pad lubrication system consistent with certain example embodiments of the present invention.
Figure 12:
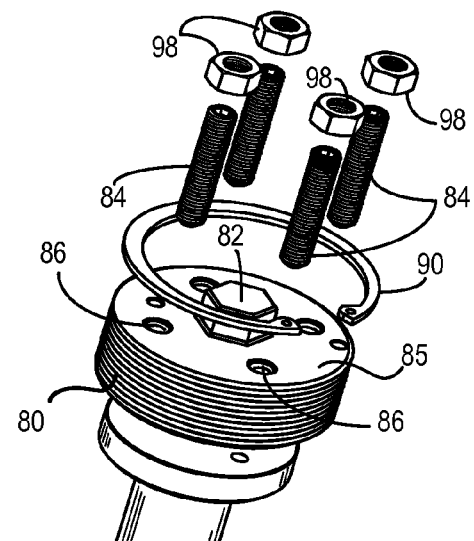
FIG. 12 is an exploded perspective view of a yaw assembly using an example four pressure bolt threaded yaw piston bushing consistent with certain embodiments of the present invention.
Figure 12:
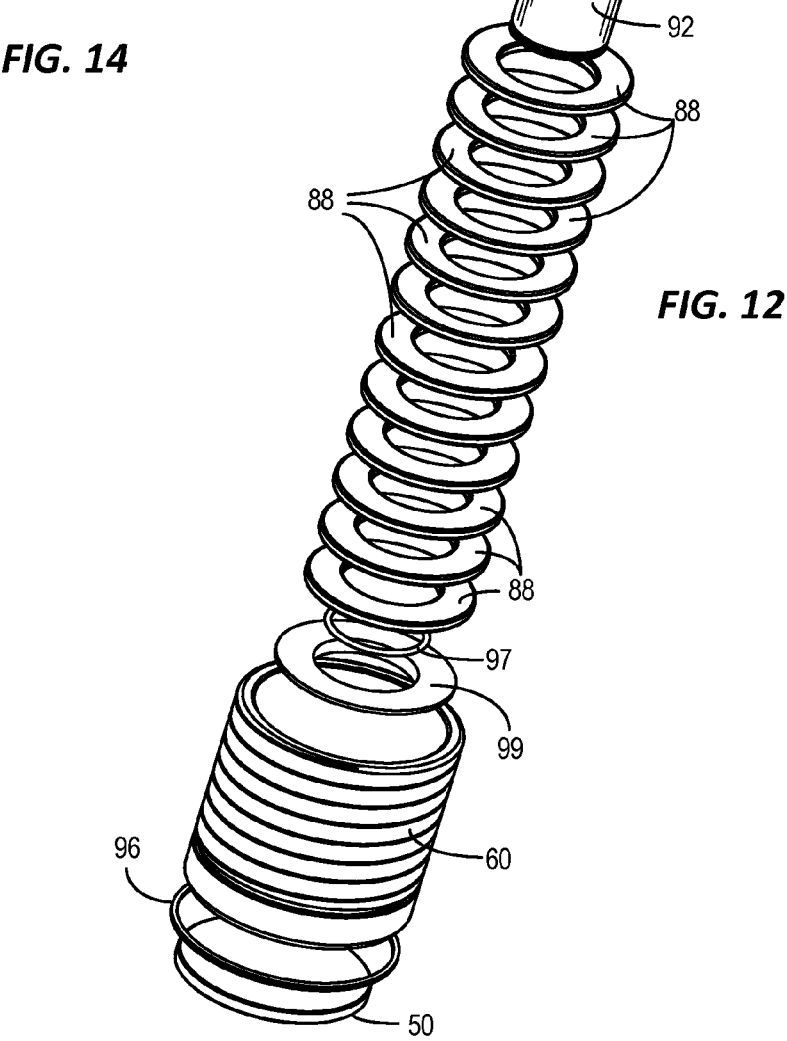
Figure 13:
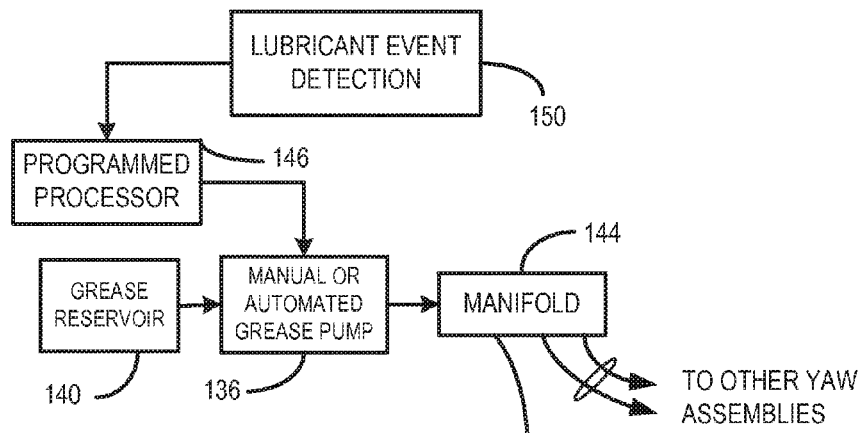
FIG. 13 is a hybrid illustration of an example yaw assembly along with a functional block diagram where the yaw assembly is shown in a cutaway sectional view along lines C-C of FIG. 14. In this view, the example yaw assembly utilizes a yaw pad lubrication system consistent with certain example embodiments of the present invention.
Figure 13:
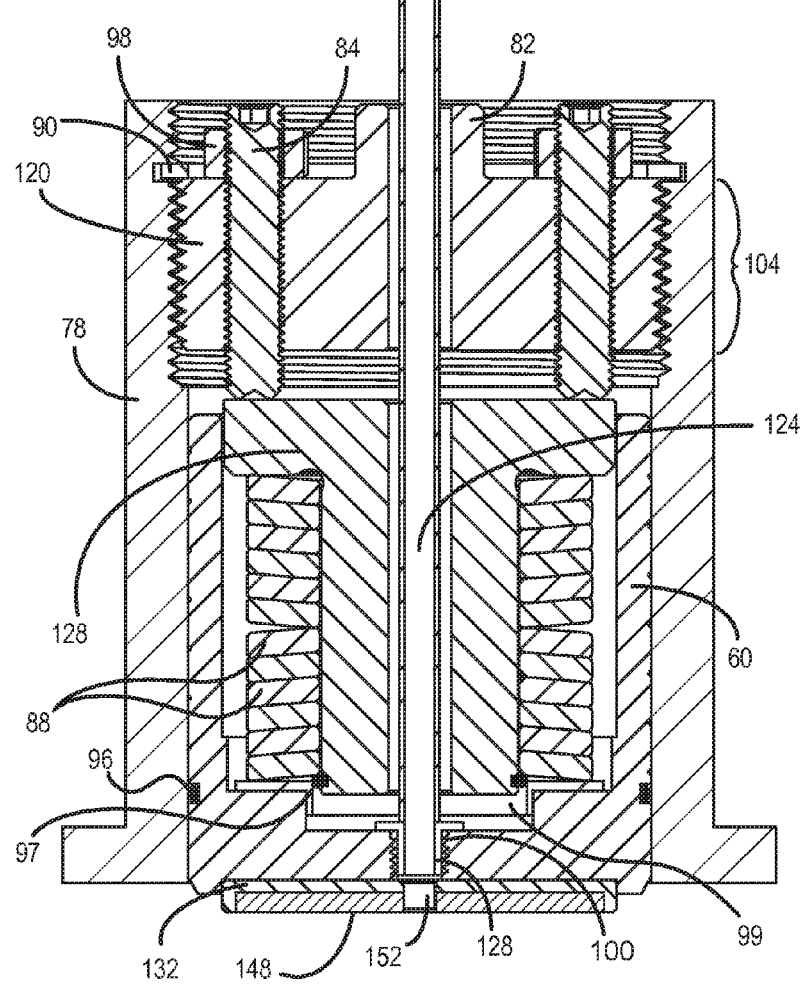

Advantageously, the elimination of the single large bolt 68 clears out a substantial amount of room above the yaw bearing assembly that can permit mounting of other structures above the cylinder. In one particular example, a yaw pad lubricating arrangement can be provided that feeds lubricant through the top of the threaded yaw piston bushing 80 to the yaw pad 50. Such an arrangement can be more readily achieved by having more room at the top of the cylinder and by not having an adjustment bolt 68 at the center of the yaw bearing assembly. One example embodiment of such lubricating arrangement is depicted in FIG. 13. This FIG. 13 is a hybrid illustration of the mechanical yaw bearing assembly together with a functional block diagram of the lubrication system. The yaw bearing assembly is shown in cross section along lines C-C of FIG. 14 which depicts the assembly in a simplified side view.

In this example embodiment, the threaded yaw piston bushing is shown as 120. In this example, a hole is bored through the center of the threaded yaw piston bushing 120 to accept a tubular insert 124 that can be sealed at the top by screw threads or any other suitable arrangement. This tubular insert provides fluid communication between the upper portion of the yaw assembly and the yaw pad and through the yaw pad to the lower surface thereof and into channels 148 in the lower surface thereof. The thrust stem 128 and the yaw pad 132 are also provided with aligned bores which accept the tubular insert 124. The tubular insert 124 is fitted with a threaded flange 128 at the lower end thereof which is threaded into a mating threaded aperture 99 that resides at the lower central wall of the yaw piston 60.

The tubular insert provides a path for grease or other suitable lubricant to be pumped to the lower surface of the yaw pad 132. This is accomplished by connecting a pump 136 to the tubular insert 124 so as to permit pumping a lubricant from a reservoir 140 to the lower surface of the yaw pad 132 through central bore 152. The reservoir 140 can be situated at or near ground level to provide for ease of servicing and replenishment of the lubricant. Alternatively, the reservoir can be situated within the nacelle 16. One pump per yaw assembly may be provided, or a single pump can be used to feed lubricant to all or a portion of the yaw assemblies via a manifold 144 with suitable tubing to connect to multiple of the yaw assemblies. In certain example implementations, the pump may be operated manually by a maintenance technician. In other examples, the pump may operate under control of a programmed processor or computer or controller 146 (operating under control of a computer program stored in a non-transitory computer storage medium) as shown in FIG. 13. In an automated implementation, lubrication can be carried out upon detection of a "lubrication event" such as a time period expiration, detection of excess friction, increased yaw motor current, detection of vibration or fog-horning or detection of another event indicative that lubrication is appropriate. Many variations will occur to those skilled in the art upon consideration of the present teachings.

In accord with certain embodiments, the yaw pad 132 may incorporate a pattern 148 of grooves milled, molded, turned, cut, drilled and/or otherwise formed in the lower surface of the yaw pad 132. Such groove pattern 148 allows for distribution of the lubricant across the lower surface of the yaw pad 132 by allowing the lubricant to flow through the central bore 152 passing through the yaw pad 132. Referring to FIGS. 15A-15F, the groove pattern may take many forms, and the patterns shown should not be considered to be limiting in any way.

Generally speaking, the yaw pad 132 has a central bore or opening 152 that allows grease or other lubricant from tube 124 to flow to the bottom surface. In these examples, the groove pattern 148 meets the opening 152 and radiates outward toward the edges of the bottom surface of the yaw pad 132 in any number of patterns. The patterns in this implementation do not quite extend all the way to the perimeter of the yaw pad 132 (e.g., stopping approximately 3-6 mm from the edge) so as to minimize the flow of lubricant outside the yaw pad 132, but they could extend all the way to the perimeter in other implementations. The grease is carried through the grooves of the groove patterns and spreads across the lower surface of the yaw pad 132 at the point of contact with the slew ring 54. The grooves can be cut deeply enough so as to remain operative in channeling the lubricant to the slew ring 54 for the life of the yaw pad 132. The pattern should preferably also not compromise the amount of surface area contacting the slew ring 54 more than necessary so as to maximize the life of the yaw pad 132 while permitting adequate lubricant to reach the slew ring 54.

The grooves should be narrow (e.g., on the order of 6-7 mm (about ¼ inch) in width in the puck shaped yaw pad 132 (which may be approximately 80 mm (about 3.15 inches) in diameter and 7 mm (about 0.275 inch) thick) and deep enough to provide the desired lubricant distribution for the life of the yaw pad 132. Approximately 3 mm of the yaw pad is recessed within the bottom of the yaw piston, hence the grooves should be at least approximately 4 mm (about 0.16 inch) or slightly deeper so that some amount of groove remains present at the end of life of the yaw pad 132. This presents a bit of tradeoff in that an adequate supply of lubricant should be provided for, but not at excessive expense of yaw pad surface area contacting the slew ring 54. However, since only a very small amount of lubricant is actually used, a narrow width of the grooves is quite acceptable for conveying the appropriate amount of lubricant to the surface of the yaw pad 132.

Thus, in accord with the present teachings, a tubular channel is in fluid communication with a lower surface of the yaw pad 132. The lower surface 148 of the yaw pad 132 has a hole 152 in fluid communication with the tubular channel. The lower surface of the yaw pad 132 has grooves 148 that are in fluid communication with the hole 152 in the yaw pad 132. The tubular channel may include a tubular member having a threaded flange 128 at a lower end thereof that is threaded into a mating threaded aperture through at a lower wall of the yaw piston 78. A pump 136 forming part of a pump system can be configured to pump lubricant from the lubricant reservoir 140 to the tubular channel to supply lubricant to the grooves 148 at the lower surface of the yaw pad 132.

In certain example embodiments consistent with the present teachings, a wind turbine yaw bearing assembly has a yaw bushing 82 having a cylindrical segment having a top surface and a bottom surface and having threads at the periphery of the cylindrical segment that are sized to mate with threads in yaw cylinder 78. A plurality of N threaded holes 86 pass through the cylindrical segment from top to bottom, where N is greater than or equal to three. A plurality of N force adjustment screws 84 are threaded and sized to screw into the N threaded holes. A plurality of N lock nuts 98 are sized to screw onto the force adjustment screws 84 to lock them into place. The force applied to preload a yaw piston assembly is adjusted by adjustment of the force adjustment screws 84 and locked in by use of the lock nuts 98. A yaw pad 132 has a grooved lower surface 148 and a passage 152 from a top surface to the lower surface grooves 148. An aperture passes through the center of the cylindrical segment from top to bottom and a tube 124 passes through the aperture to direct lubricant to the yaw pad passage 152. A pump 136 is coupled to the tube 124 configured to pump lubricant from lubricant reservoir 140 through the tube 124 to the lower surface grooves 148 of the yaw pad 132. Tube 124 may also provide improved stability of the thrust stem 128 so as to inhibit rocking of the thrust stem.

In certain implementations, an anti-rotation collar 99 is disposed between the spring 88 and the yaw piston 78 at a lower end of the thrust stem 128. In certain implementations, a programmed computer 146 is coupled to the pump 136 and is configured to activate the pump in order to pump a quantity of lubricant to the yaw pad 132 upon making a determination under program control to lubricate the yaw pad. In certain implementations, a manifold 144 is disposed between the pump 136 and the tube 124 so as to distribute lubricant to the tube 124 and to at least one other destination. In certain implementations, a spring loaded thrust stem 128 is disposed within the yaw piston 78 and between the force adjustment screws 84 and the yaw pad 132 that is arranged to apply force to the yaw pad 132. The thrust stem 128 has a central channel through which the tube 124 passes to place the yaw pad 132 in fluid communication with the pump 136. Many other variations will occur to those skilled in the art upon consideration of the present teachings.

Figure 15A:
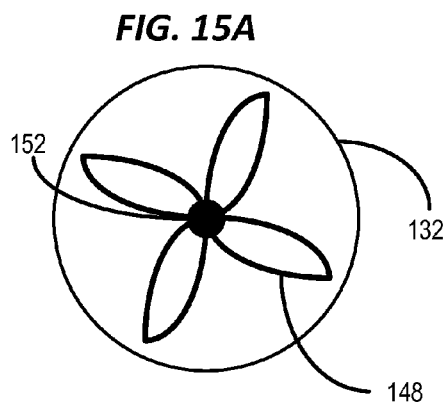
FIGS. 15A-15F are examples of several sample patterns that can be machined or otherwise provided in the lower surface of the yaw pad in a manner consistent with certain example embodiments of the present invention.
Figure 15D:
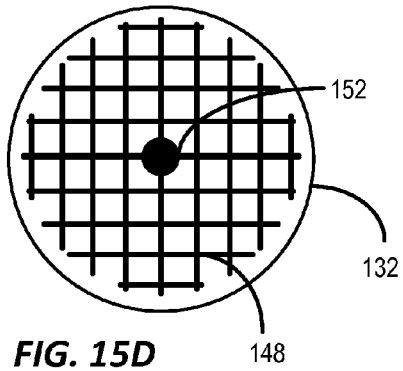
Figure 15B:
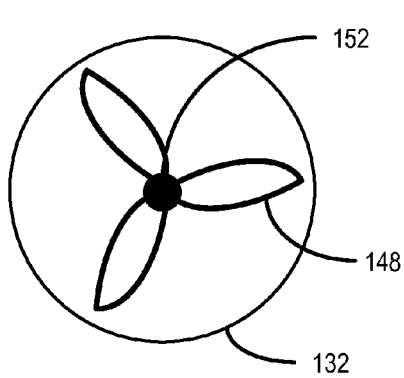
Figure 15E:
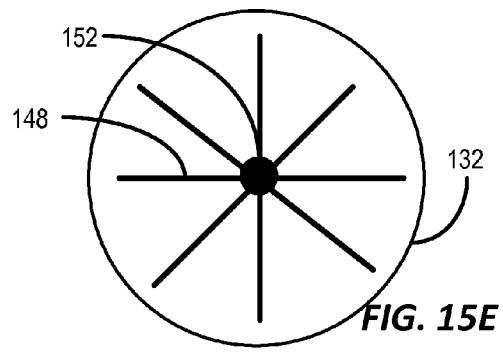
Figure 15C:
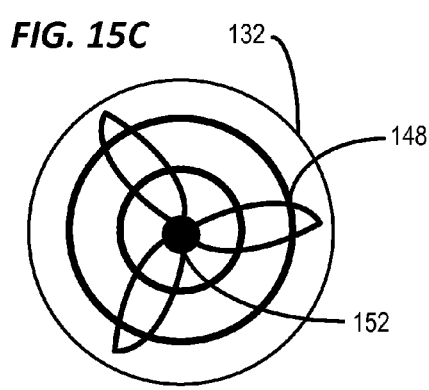
Figure 15F:
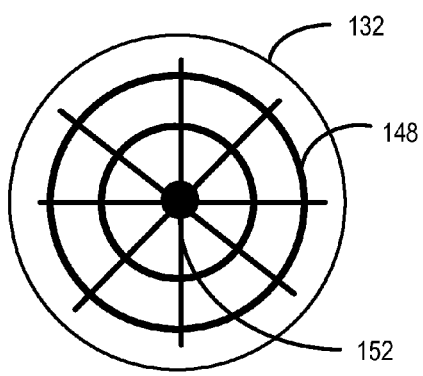

FIGS. 15A-15B depict example patterns of grooves 148 that can be used which resemble a set of pedal shaped wind turbine blades (four and three blades respectively) that are disposed symmetrically about the central bore 132. FIG. 15C similarly shows a pattern of grooves 148 resembling symmetrically arranged petal shaped wind turbine blades with concentric circles passing through them so as to provide redundant paths for lubricant flow. FIG. 15D depicts a pattern of crisscrossing grooves 148 that intersect the central opening 152 and provide multiple paths for the lubricant from center to near the outer edge. FIG. 15E depicts a pattern of grooves 148 that resemble bicycle spokes radiating toward the outer surface of the yaw pad 132. FIG. 15F is similar to FIG. 15E with inclusion of concentric circular grooves that provide redundant paths to the outer surface.

Many other configurations are also possible without limitation. While the groove patterns shown end prior to the perimeter edge of the yaw pad 132, this is not to be considered limiting since one or more paths can extend to the outer perimeter to permit debris from wear to escape as additional grease is pumped into the yaw pad 132's grooves 148, providing that the excess lubricant escaping causes no problems. In addition to the patterns shown, a logo, trademark, serial number, model number or other designation can be incorporated into the yaw pad 132 surface (e.g., as part of groove pattern 148) for ease of identification of the source of the yaw pad 132. Other variations will occur to those skilled in the art upon consideration of the present teachings.

Thus, a yaw bearing pad 132 consistent with certain implementations has a cylindrical segment of yaw bearing pad material having a perimeter, and has an upper surface and a lower surface that are substantially parallel to one another. A central passage 152 is provided between the upper and lower surface. A pattern of grooves 148 is provided in the lower surface that extends outward toward the perimeter from the central passage 152 to a position that is short of reaching the perimeter. In other embodiments, the grooves can extend all the way to the perimeter.

In certain implementations, the yaw bearing pad material can be at least one of one of: brass, bronze and polymers, composites, sintered metal such as bronze, polyether ether ketone (PEEK), oil impregnated bronze, and layered synthetic fiber reinforced formulations. In certain implementations, the yaw bearing pad 132 has a thickness of approximately 7 mm and where the grooves are approximately 4 mm deep.

Figure 16:
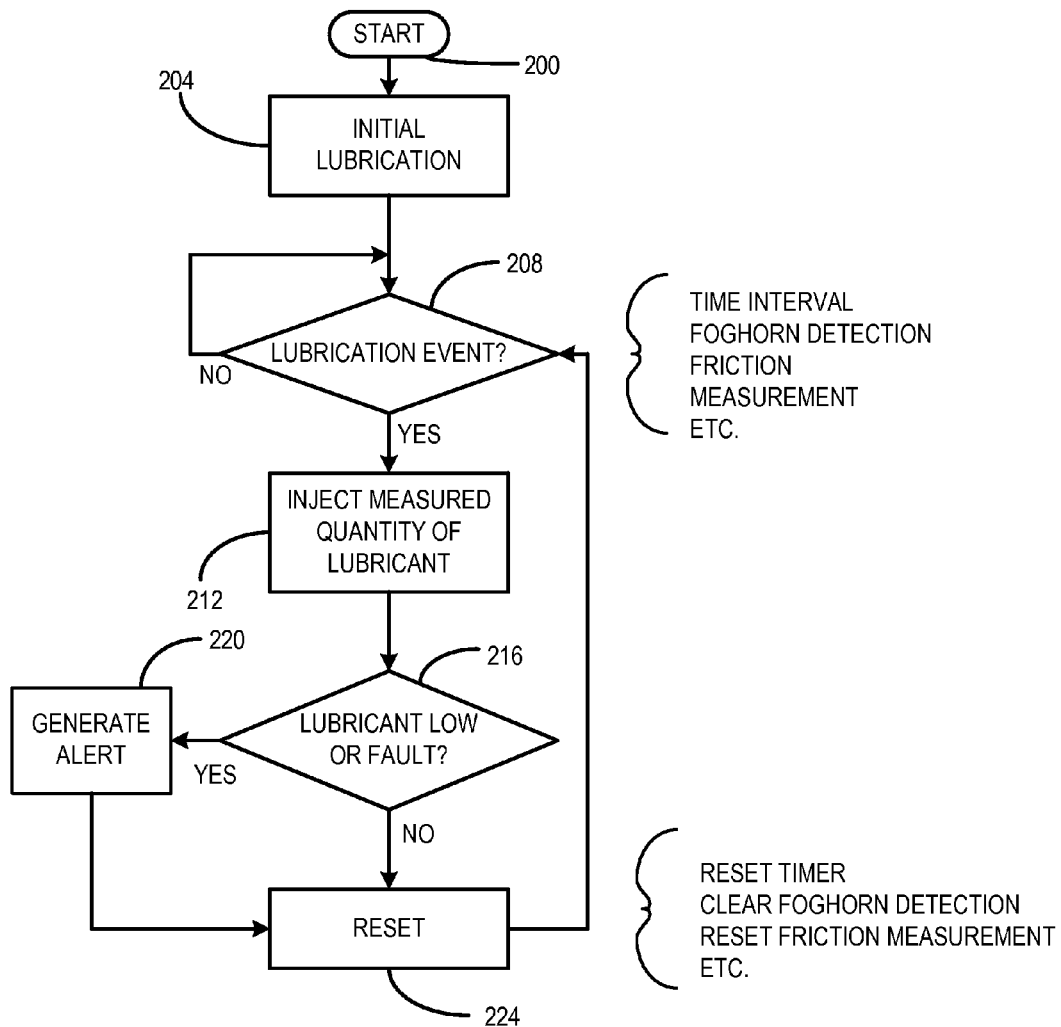
FIG. 16 is an example flow chart depicting operation of one embodiment of a computer controlled yaw pad lubrication system consistent with certain example embodiments of the present invention.

With reference to FIG. 16, an example process for carrying out lubrication of the yaw pads starting at 200. An initial lubrication of the yaw pads 132 can be carried out at 204 by manually or otherwise pumping or applying a lubricant to the pads to load the pads 132 with a small amount of grease during installation. At 208, processor 146 detects that an event has occurred that triggers application of additional lubricant. In one example, this can be determined by the passage of time. For example, dispensing of a small amount of lubrication can be scheduled for every two weeks or once per month. In another example embodiment, the system may be equipped with a foghorn detection circuit which detects the vibration or noise associated with the onset of fog-horning (e.g., a sensor that measures sound pressure level). This onset can be considered to be an indication that lubrication is needed. In another example, a measurement of the friction or ease of movement of the nacelle 16 with respect to the tower can be taken and excess friction can be used as an event to trigger lubrication. In another example, the current of the yaw motors can be measured and lubrication can be carried out when the current exceeds a limit as an indication of increased friction. Other lubrication event triggers such as a measure of Megawatt-hours of electricity produces, a distance the nacelle has rotated, or other indicators can be used as lubrication event triggers by those skilled in the art upon consideration of the present teachings. Other event triggers will occur to those skilled in the art upon consideration of the present teachings.

Whenever a lubrication event occurs, a measured quantity of lubricant can be injected into each of the yaw pad assemblies at 212. The amount injected need not be very large so as to minimize accumulation of excess lubricant. The amount of lubricant can be set by setting a time for operation of the pump, taking into consideration the volume of fluid pumped by the pump per given time period so that the proper amount of lubricant is injected. At 216, the processor can check to assure that no fault has occurred in the process and can verify that the reservoir contains adequate lubricant. If a fault is discovered or the lubricant is low, an alert can be generated at 220. For example, a light can be turned on or a signal can be transmitted to bring the condition to the attention of a caretaker or technician. Other variations will occur to those skilled in the art. Control passes to 224 at this point from 216 or from 220 where the lubrication event is reset if needed. For example, a timer can be reset, a foghorn detector or friction measurement or alarm can be checked and reset to await the next event. Control then returns to 208 to await the next lubrication event. Other variations will occur to those skilled in the art upon consideration of the present teachings.

Thus, a method of providing lubrication to a yaw pad 132 in a wind turbine 10 consistent with the present teachings involves: providing a yaw pad assembly that includes a yaw pad 132 having a central passage 152 and a pattern of grooves 148 on a lower surface thereof where the central passage is in fluid communication with the pattern of grooves 148, a threaded yaw bushing 120 having a central channel passing from an upper surface to a lower surface thereof, and a thrust stem 128 having a central channel passing therethrough from an upper surface to a lower surface thereof; using a lubricant pump 136 to pump 212 a lubricant from a lubricant reservoir 140 to the lower surface of the yaw pad 132 through the central passage thereof to the pattern of grooves 148; and where the lubricant passes through the central channels of the threaded yaw bushing 120 and the thrust stem 128.

In certain implementations, the lubricant is pumped through a tube 124 that is in fluid communication with the yaw pad's central passage 152 and where the tube 124 is adapted to pass through the thrust stem's central channel and through the threaded yaw bushing's central channel to couple lubricant from the lubricant pump 136. In certain implementations, a programmed processor activates the lubricant pump for a prescribed period of time upon the programmed processor 146 detecting a lubrication event at 208. In certain implementations, the lubrication event at 208 can be at least one of: detection of expiration of a time interval, detection of fog-horning, detection of vibration, detection of sounds, detection of increased yaw motor current and detection of excess friction. By measuring the current to the motors that control yawing of the wind turbine, one can determine the load on the motors and from that declare a lubrication event.

In order to utilize the present teachings in the existing installed base of compatible wind turbines, a retrofit kit can be provided that contains the following items in one embodiment:

The improved threaded yaw piston bushing 80.

A plurality of N force adjustment screws 84 (where N is greater than or equal to 3) and corresponds to the number of threaded holes that pass through the yaw piston busing 80. These force adjustment screws 84 are or can be screwed into mating threaded holes in yaw piston 80

A plurality of N lock nuts 98 that are or can be threaded onto the force adjustment screws 84.

A set of instructions for carrying out the retrofit.

In addition to the above parts, any or all of the following additional parts may be supplied as a part of the kit:

A replacement piston lock C-clip 90.

A replacement piston outer O-Ring 96.

An anti-rotation collar 99 for replacement of hardened steel washer 93.

A replacement yaw pad 50.

A replacement thrust stem 92.

A replacement O-Ring 97.

In order to utilize the present teachings in the existing installed base of compatible wind turbines so as to provide for lubrication as described herein, a retrofit kit can be provided that contains the following items in one embodiment:

The improved threaded yaw piston bushing 80.

A plurality of N force adjustment screws 84 (where N is greater than or equal to 3 and corresponds to the number of threaded holes that pass through the yaw piston busing 80). These force adjustment screws 84 are or can be screwed into mating threaded holes in yaw piston 80.

A plurality of N lock nuts 98 that are or can be threaded onto the force adjustment screws 84.

A replacement thrust stem 128 with central hole bored therein.

A replacement O-Ring 97.

A tubular insert 124.

A yaw pad 132 having a central aperture and bottom surface groove pattern 148.

A lubricant reservoir 140 and pump 136.

Tubing for connection of the reservoir, pump and yaw assembly.

A supply of lubricant.

A controller and sensors and a wiring kit for installation of controller and sensors.

A set of instructions for carrying out the retrofit.

In addition to the above parts, any or all of the following additional parts may be supplied as a part of the kit:

A replacement piston lock C-clip 90.

A replacement piston outer O-Ring 96.

An anti-rotation collar 99 for replacement of hardened steel washer 93.

A lubricant manifold 144.

The use of any and all examples, or language indicating an example ("e.g." or "such as" or "for example") provided herein, is intended merely to better illuminate the invention and does not pose a limitation on the scope of the invention unless otherwise explicitly claimed. No language in the specification should be construed as indicating any non-claimed element as essential to the practice of the invention.

Those skilled in the art will recognize, upon consideration of the above teachings, that certain of the above exemplary embodiments are based upon use of a programmed processor 146. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain example embodiments described herein, are or may be implemented using a programmed processor executing programming instructions that are broadly described above in flow chart form that can be stored on any suitable electronic or computer readable non-transitory storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies), where the term "non-transitory" is intended to exclude propagating signals. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain example embodiments of the invention. Error trapping can be added and/or enhanced and variations can be made in user interface and information presentation without departing from certain example embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A wind turbine threaded yaw piston bushing arrangement, comprising:
    a cylindrical segment having a top surface and a bottom surface and having threads at a periphery of the cylindrical segment that are sized to mate with threads in a yaw cylinder;
    a plurality of N threaded holes passing through the cylindrical segment from top surface to bottom surface that are sized to accept a plurality of N force adjustment screws to thread into the N threaded holes;
    a plurality of N lock nuts that are sized to screw onto the N force adjustment screws to lock them into place, where the force applied to preload a yaw piston assembly is adjusted by adjustment of the N force adjustment screws and locked into place by use of the N lock nuts;
    where the plurality of N threaded holes are distributed symmetrically about the cylindrical segment;
    where N is an integer greater than or equal to three; and
    a wrench mating structure situated at or near the top surface of the cylindrical segment.

2. The arrangement according to claim 1, further comprising:
    a spring;
    the yaw piston;
    a thrust stem residing within the yaw piston; and
    the yaw piston pressed downward within the yaw cylinder by the plurality of N force adjustment screws passing through the plurality of N threaded holes to apply downward pressure via the spring to the yaw piston.

3. The arrangement according to claim 2, further comprising an anti-rotation collar disposed between the spring and the yaw piston at a lower end of the thrust stem.

4. The arrangement according to claim 2, further comprising a yaw pad, where the yaw pad is pressed downward against a slew ring under the force of the yaw piston.

5. The arrangement according to claim 2, where the arrangement further comprises:
    a wind turbine having a nacelle and a tower;
    a yaw pad;
    a slew ring residing between the nacelle and the tower; and
    where the yaw pad is pressed downward against the slew ring by the force of the yaw piston.

6. The arrangement according to claim 5, further comprising a tubular channel in fluid communication with a lower surface of the yaw pad.

7. The arrangement according to claim 6, where:
    the lower surface of the yaw pad has a hole in fluid communication with the tubular channel; and
    the lower surface of the yaw pad has grooves that are in fluid communication with the hole in the yaw pad.

8. The arrangement according to claim 6, where the tubular channel comprises a tubular member having a threaded flange at a lower end thereof that is threaded into a mating threaded aperture through at a lower wall of the yaw piston.

9. The arrangement according to claim 6, further comprising:
a lubricant reservoir; and
a pump system configured to pump lubricant from the lubricant reservoir to the tubular channel to supply lubricant to the lower surface of the yaw pad.

10. A wind turbine yaw bearing assembly, comprising:
a yaw bushing comprising:
a cylindrical segment having a top surface and a bottom surface and having threads at a periphery of the cylindrical segment that are sized to mate with threads in a yaw cylinder;
a plurality of N threaded holes passing through the cylindrical segment from top to bottom;
where N is greater than or equal to three;
a plurality of N force adjustment screws that are threaded and sized to screw into the N threaded holes;
a plurality of N lock nuts that are sized to screw onto the force adjustment screws to lock them into place;
whereby the force applied to preload a yaw piston assembly is adjusted by adjustment of the force adjustment screws and locked in by use of the lock nuts;
a yaw pad having a grooved lower surface and having a passage from a top surface to the grooved lower surface;
an aperture passing through a center of the cylindrical segment from top to bottom;
a tube passing through the aperture to direct lubricant to the yaw pad passage; and
a pump coupled to the tube configured to pump lubricant from a lubricant reservoir through the tube to the lower surface of the yaw pad.

11. The assembly according to claim 10, further comprising a spring and an anti-rotation collar disposed between the spring and the yaw piston at a lower end of a thrust stem.

12. The assembly according to claim 10, further comprising:
a programmed computer coupled to the pump and configured to activate the pump in order to pump a quantity of lubricant to the yaw pad upon making a determination under program control to lubricate the yaw pad.

13. The assembly according to claim 10, further comprising:
a manifold disposed between the pump and the tube that is configured to distribute lubricant to the tube and to at least one other destination.

14. The assembly according to claim 10, further comprising:
a yaw piston;
a spring loaded thrust stem disposed within the yaw piston and between the force adjustment screws and the yaw pad that is arranged to apply force to the yaw pad; and
the thrust stem having a central channel through which the tube passes to place the yaw pad in fluid communication with the pump.

15. A wind turbine yaw assembly, comprising:
a yaw piston;
a yaw bearing pad;
a spring residing inside the yaw piston and applying spring pressure to the yaw bearing pad;
a threaded yaw piston bushing that applies adjustable pressure to the spring;
the threaded yaw bushing having at least three force adjustment screws distributed symmetrically about the threaded yaw piston bushing;
a plurality of lock nuts threaded to the at least three force adjustment screws to lock the at least three force adjustment screws into place; and
a thrust stem disposed within the yaw piston and between the at least three force adjustment screws and the yaw bearing pad that is arranged to apply force through the spring to the yaw bearing pad,
where the spring pressure is adjusted by tightening or loosening the at least three force adjustment screws.

16. The assembly according to claim 15, further comprising an anti-rotation collar disposed between the spring and the yaw piston at a lower end of the thrust stem.

17. A wind turbine yaw bearing assembly retrofit kit, comprising:
a replacement threaded yaw piston bushing having an upper and lower surface with a plurality of N threaded holes distributed symmetrically about the yaw piston bushing passing from the upper surface to the lower surface;
where N=3 or more;
a plurality of N force adjustment screws; and
a plurality of N lock nuts that thread into the plurality of N force adjustment screws.

18. The kit according to claim 17, further comprising a set of instructions for carrying out a process of retrofitting the kit into a wind turbine yaw bearing assembly.

19. The kit according to claim 17, further comprising a replacement yaw pad.

20. The kit according to claim 17, further comprising:
a replacement piston lock C-clip;
a replacement piston outer O-Ring; and
an anti-rotation collar.

21. The kit according to claim 17, where the threaded yaw bushing has a central channel passing from an upper surface to a lower surface thereof, and further comprising:
a lubricant pump;
a lubricant reservoir;
a replacement yaw bearing pad having a central passage and a pattern of grooves on a lower surface thereof;
a replacement thrust stem having a central channel; and
a tube for coupling to the yaw bearing pad central passage that is adapted to pass through the thrust stem's central channel and through the threaded yaw bushing's central channel to couple lubricant from the lubricant pump to the yaw bearing pad.

22. The kit according to claim 21, further comprising a programmed processor configured to control the lubricant pump.

23. The kit according to claim 21, further comprising a lubricant manifold.

24. The kit according to claim 21, where the replacement yaw bearing pad has a diameter of approximately 80 mm and a thickness of approximately 7 mm and where the grooves are greater than approximately 4 mm deep.

25. A wind turbine threaded yaw piston bushing arrangement, comprising:
a cylindrical segment of steel having a top surface and a bottom surface and having M100×3.0 threads at the periphery of the cylindrical segment to mate with mating threads in a yaw cylinder;
where the cylindrical segment is about 100 mm in diameter and about 35 mm from top surface to bottom surface;
a plurality of N threaded holes passing through the cylindrical segment from top surface to bottom surface that are sized to accept a plurality of N force adjustment screws to thread into the N threaded holes;

a plurality of N lock nuts that are sized to screw onto the N force adjustment screws to lock them into place, where the force applied to preload a yaw piston assembly is adjusted by adjustment of the N force adjustment screws and locked into place by use of the N lock nuts;

where the plurality of N threaded holes are distributed symmetrically about the cylindrical segment;

where N is an integer greater than or equal to three; and a wrench mating structure situated at or near the top surface of the cylindrical segment.

26. A method of providing lubrication to a yaw pad in a wind turbine, comprising:

providing a yaw pad assembly comprising:

a yaw pad having a central passage and a pattern of grooves on a lower surface thereof where the central passage is in fluid communication with the pattern of grooves, a threaded yaw bushing having a central channel passing from an upper surface to a lower surface thereof, and a thrust stem having a central channel passing therethrough from an upper surface to a lower surface thereof;

using a lubricant pump to pump a lubricant from a lubricant reservoir to the lower surface of the yaw pad through the central passage thereof to the pattern of grooves; and where the lubricant passes through the central channels of the threaded yaw bushing and the thrust stem.

27. The method according to claim 26, where the lubricant is pumped through a tube that is in fluid communication with the yaw pad's central passage and where the tube is adapted to pass through the thrust stem's central channel and through the threaded yaw bushing's central channel to couple lubricant from the lubricant pump.

28. The method according to claim 26, further comprising, at a programmed processor activating the lubricant pump for a prescribed period of time upon the programmed processor detecting a lubrication event.

29. The method according to claim 28, where the lubrication event comprises at least one of: detection of expiration of a time interval, detection of fog-horning, detection of vibration, detection of sounds, detection of excess yaw motor current and detection of excess friction.

* * * * *